United States Patent [19]
Lemon et al.

[11] 3,771,549
[45] Nov. 13, 1973

[54] SYSTEM FOR LOADING AND UNLOADING A CONTAINER AT ITS BOTTOM

[75] Inventors: Stephen C. Lemon, Cumberland, Pa.; Robert L. Murray, Dayton, Ky.

[73] Assignee: Dover Corporation, New York, N.Y.

[22] Filed: Oct. 21, 1971

[21] Appl. No.: 191,386

[52] U.S. Cl.................. 137/393, 251/29, 141/113
[51] Int. Cl. ................................................ F15c 1/14
[58] Field of Search.................. 137/386, 390, 391, 137/393, 414, 522, 523, 842; 141/113, 128; 251/29, 62

[56] References Cited
UNITED STATES PATENTS

| | | | |
|---|---|---|---|
| 3,020,924 | 2/1962 | Davies | 137/386 |
| 3,029,833 | 4/1962 | DeFrees | 137/414 |
| 3,095,894 | 7/1963 | Jensen | 137/390 X |
| 3,251,375 | 5/1966 | Reed et al. | 137/414 |
| 3,269,404 | 8/1966 | Lebow | 137/386 X |
| 3,406,709 | 10/1968 | Elbogen et al. | 137/391 X |
| 3,561,465 | 2/1971 | Graaf | 137/386 |

*Primary Examiner*—Martin P. Schwadron
*Assistant Examiner*—David R. Matthews
*Attorney*—J. Warren Kinney, Jr. et al.

[57] ABSTRACT

A container is loaded at its bottom until the level of the liquid in the container reaches a predetermined level. The predetermined level is sensed by a sensor, which is supported within the container, having liquid from the container flow through an opening in the sensor body when the predetermined level is reached to stop the flow of compressed air through passage in the body whereby a vacuum, which is produced by the flow of the compressed air through the body passage, ceases to exist. When this occurs, a fluidic interface valve has its position changed to stop the flow of compressed air to a valve, which is controlling the flow of the liquid to the bottom of the container. A vent in the top of the container is opened whenever the valve is opened to introduce liquid into the container.

16 Claims, 12 Drawing Figures

FIG. 1

Patented Nov. 13, 1973

INVENTORS
ROBERT L. MURRAY
STEPHEN C. LEMON

BY *Kinney + Schenk*

ATTORNEYS

INVENTORS
ROBERT L. MURRAY
STEPHEN C. LEMON
BY
Kenney + Schenk
ATTORNEYS

Patented Nov. 13, 1973

INVENTORS
ROBERT L. MURRAY
STEPHEN C. LEMON

BY

*Kinney & Schenk*

ATTORNEYS

SYSTEM FOR LOADING AND UNLOADING A CONTAINER AT ITS BOTTOM

In loading over the road tank trucks, which are capable of hauling substantial quantities of gasoline, for example, the tank, which is normally divided into a plurality of compartments is loaded from the top. However, there are a number of dangers in loading the tank of a truck at the top.

One of these is that the drop pipe, which supplies the gasoline to the tank through a manhold opening in the top of the tank, usually has a diameter of about 4 inches while the manhole opening is normally about 10 inches in diameter. As a result, the truck operator, who has to be on top of the truck to maintain the drop pipe within the manhole opeing, is exposed to the fumes produced by the gasoline flowing into the tank.

Furthermore, if the drop pipe is not below the surface of the gasoline within the tank and this cannot occur until there has been substantial flow into the tank, there is a large turbulence created within the tank with increased quantities of vapor being produced.

In addition to the above there also is the possibility of the truck operator falling from the top of the tank because spillage of gasoline occurs during filling, and this creates a slippery condition in the area in which the operator must work. Since the top of the tank truck is about twelve feet from the ground, a fall by the operator from this distance can seriously injure him.

Additionally, it has previously been necessary to utilize various types of structural arrangements to enable the truck operator to get on top of the tank to open the manhole opening for the tank so as to vent the tank and place the drop pipe within the manhole opening. This type of structural mechanism is expensive and complicated.

The present invention satisfactorily overcomes the foregoing problems by providing a system for loading and unloading a tank truck at the bottom of the tank. By employing the present invention, it is not necessary for the truck operator to have to be on top of the truck. Accordingly, there is no possibility of the operator being injured by falling from the top of the truck.

The present invention eliminates the need for the operator to have to be on top of the truck through loading at the bottom and having means, separate from the manhole opening, to vent the top of the tank that may be actuated without the operator having to be on top of the truck. Thus, the present invention automatically produces venting of the tank whenever gasoline is supplied to the tank or removed from the tank.

Through loading the tank at the bottom, the turbulence of the gasoline within the tank is very low. With the level of the liquid very calm, production of vapor fumes is significantly decreased.

While the bottom loading of the tank truck prevents the operator from visually ascertaining the level of the gasoline in the tank through the manhole opening, the present invention utilizes a liquid level sensor, which is mounted within the tank, to ascertain when the level of the gasoline in the tank has reached a predetermined level at which no additional gasoline is to be supplied. Thus, the present invention eliminates the need for any visual inspection of the level of the gasoline in the tank so that the operator does not have to be on top of the tank. If the level in the tank is at the predetermined level, the level sensor prevents the supply of gasoline to the tank.

Furthermore, there is no need to precheck the level sensor of the present invention since gasoline cannot be supplied to the tank if the sensor fails to work. Thus, loading of the tank cannot occur if the liquid in the tank is at the predetermined level or the sensor fails to function for any reason.

An object of this invention is to provide a system for loading and unloading a container at its bottom with a liquid such as gasoline, for example.

A further object of this invention is to provide a system for loading a container in which liquid cannot be supplied if a level sensor fails to operate or the level of the liquid in the tank has reached a predetermined level.

Other objects, uses, and advantages of this invention are apparent upon a reading of this description, which preceeds with reference to the drawings forming part thereof and wherein:

Figure 1:
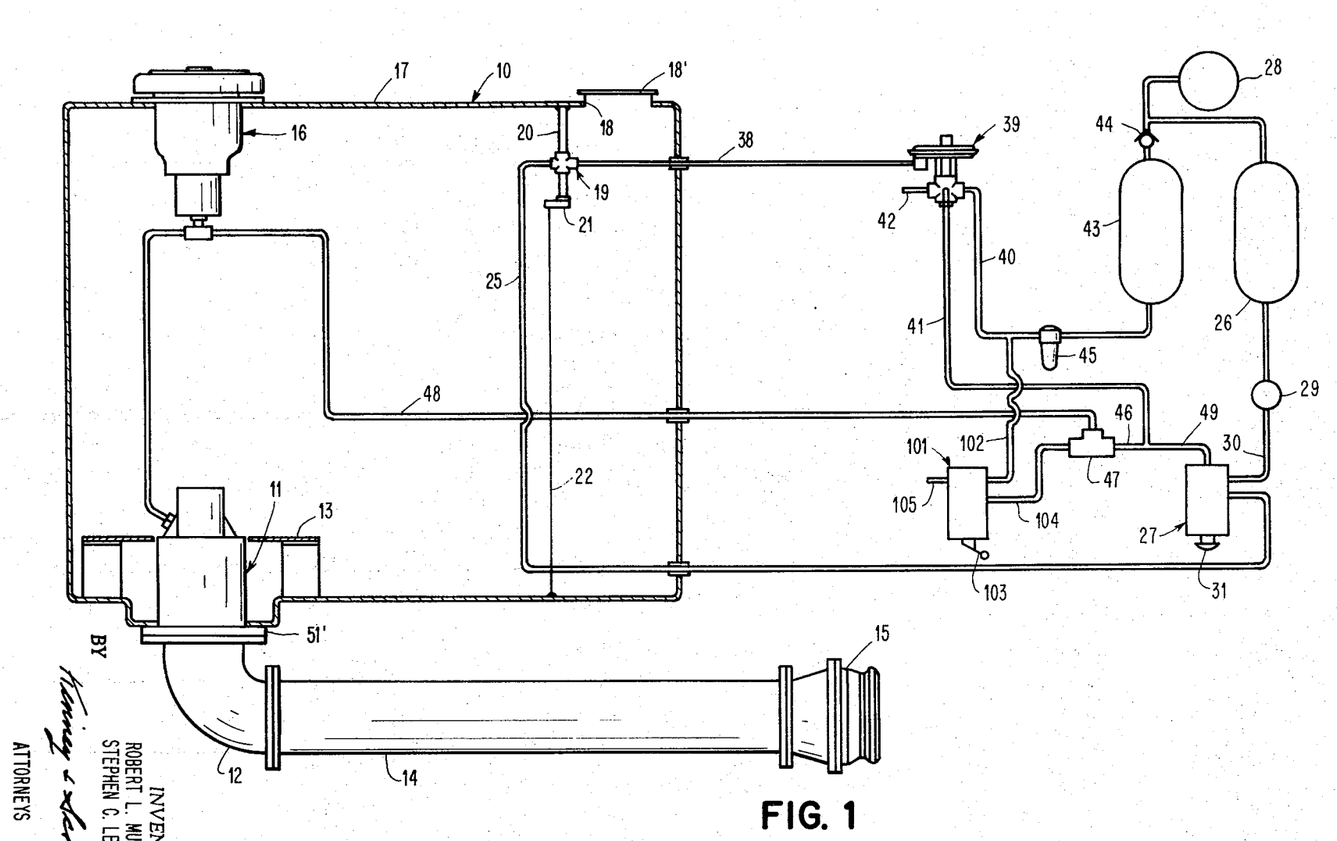
FIG. 1 is a schematic view of one form of the loading and unloading system of the present invention.

Referring to the drawings and particularly FIG. 1, there is shown a container 10 such as a tank of a tank truck, for example, for holding a liquid such as gasoline, for example. It should be understood that the container 10 may be other than a tank mounted on a truck such as a railroad tank car or a stationary tank, for example. Furthermore, while the present invention is described as loading gasoline, it should be understood that any other liquid could be supplied to the container 10.

The gasoline is supplied to the bottom of the container 10 through a valve 11, which must be open for gasoline to be introduced into the container 10. The valve 11, which has a deflector 13 cooperating therewith to direct the gasoline outwardly into the container 10, communicates with a source of gasoline (not shown) through an elbow 12, a manifold 14, and a Kamvalock adapter 15, which is adapted to couple the manifold 14 to a pipe leading to the source of the gasoline. Accordingly, when the adapter 15 is coupled to the source of gasoline and the valve 11 is opened, gasoline flows into the bottom of the container 10. The adapter 15 closes the end of the manifold 14 unless the adapter 15 is coupled to a pipe leading to the source of the gasoline.

The container 10 has a vent 16 supported in its top wall 17 for venting the container 10 when it is being loaded with gasoline or when gasoline is being removed from the container 10. The vent 16 is automatically controlled so that it is not necessary for the operator to climb on top of the container 10 to open the vent 16. The container may have more than one of the vents 16 depending on the size of the container 10. The top wall 17 of the container 10 also has a manhole opening 18 which is closed by a cover 18'.

A level sensor 19 is supported within the container 10 and is adjustably mounted on a support rod 20, which extends downwardly from the top wall 17 of the container 10. The bottom of the support rod 20 has a block 21 secured thereto to provide static protection. A wire 22 extends from the block 21 to the bottom of the container 10 to give the man an electrical connection to the bottom of the container 10.

The level sensor 19 has compressed air supplied to a passage 23 (see FIG. 5) in its body 24 through a line 25 (see FIG. 1) from a reservoir 26 when load valve 27 is opened. The air reservoir 26, which receives compressed air from a compressor 28 such as the air compressor of the truck that is used to supply compressed air for the braking system of the truck, for example, is connected to a port in the load valve 27 through a regulator 29. The regulator 29 reduces the pressure from approximately 100 to 150 p.s.i. in the air reservoir 26 to approximately 20 p.s.i. in a line 30, which connects the regulator 29 with the port in the load valve 27. One suitable example of the regulator 29 is sold by Bastin-Blessing Company, Chicago, Illinois under the tradename Rego as model 8802 PL.

The load valve 27 is a three-way, two-position valve. One suitable example of the load valve 27 is sold be Versa of Englewood, New Jersey as series V and T three-way valve with an air pilot, manual actuator, and spring return. To open the load valve 27 to allow compressed air to flow from the reservoir 26 to the sensor 19, a palm buttom 31 of the load valve 27 is moved outwardly against the force of a spring to allow communication between the lines 30 and 25.

Figure 4:
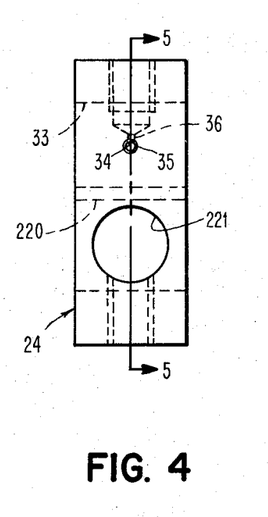
FIG. 4 is an elevational view of a liquid level sensor for use with the system of FIG. 1.

The compressed air is supplied from the line 25 through a threaded port 32 (see FIG. 5) in the body 24 of the level sensor 19 to the passage 23. The passage 23 communicates with an enlarged opening 33 in the body 24. As shown in FIG. 4, the opening 33 extends through the body 24 so that gasoline in the container 10 may flow into the opening when the level of the gasoline in the container 10 reaches the level at which the opening 33 in the body 24 is positioned.

Figure 5:
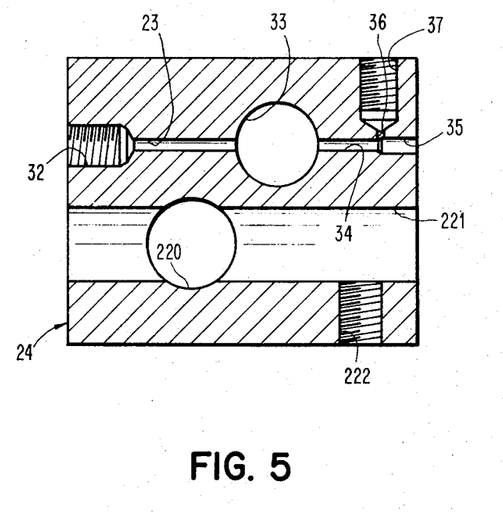
FIG. 5 is a sectional view of the level sensor of FIG. 4 and taken along line 5—5 of FIG. 4.

The body 24 has a passage 34, which is of the same diameter as the passage 23, aligned with the passage 23 so as to form a continuation thereof since it is the same diameter. The passage 34 communicates with an aligned passage 35, which is of a larger diameter than the passages 23 and 34. The body 24 has a passage 36, which is substantially perpendicular to the passages 23, 34, and 35, communicating with the passage 34 and with a threaded port 37.

Accordingly, the compressed air enters the body 24 at the threaded port 32 and passes through the passage 23, which has a length approximately ten times its diameter so as to achieve some semblance of slug flow prior to flowing across the opening 33 to the passage 34; this is necessary so that the compressed air will not escape through the opening 33. As the compressed air flows from the passage 34 into the passage 35, it expands but this is downstream from the intersection of the transverse passage 36 with the passage 34. As a result, expansion is not complete at the passage 36 so that a vacuum exists in the passage 34 between the junction of the passages 34 and 35 and the intersection of the transverse passage 36 with the passage 34. Accordingly, a vacuum is created in the threaded port 37 as long as the opening 33 is not blocked by the gasoline in the container 10.

The compressed air escapes from the passage 35 into the interior of the container 10. With the vent 16 automatically opened during loading and unloading of the container 10, the compressed air may escape to the atmosphere through the vent 16.

The relation of the position of the transverse passage 36 to the junction of the passages 34 and 35 is critical as to the amount of vacuum produced in the threaded port 37. An increased vacuum is produced in the threaded port 37. An increased vacuum is produced when the intersection of the transverse passage 36 with the passage 34 is closer to the junction of the passage 34 and 35 while the vacuum sensing decreases as the intersection of the transverse passage 36 with the passage 34 is moved further away from the junction of the passages 34 and 35.

The threaded port 37 is connected by a line 38 (see FIG. 1) to a fluidic interface valve 39. The fluidic interface valve 39 is a three-port, two-way valve having a resiliently biased diaphragm subjected to the condition in the line 38. One suitable example of the fluidic interface valve 39 is sold under the tradename Asco as model XF 30273 by the Automatic Switch Company.

As long as the line 38 has a vacuum therein, the diaphragm in the fluidic interface valve 39 positions the two-way valve so that there is communication between lines 40 and 41. Whenever there is no vacuum in the line 38, ths two-way valve is disposed so that the line 40 is blocked from communication with the line 41 and the line 41 communicates with an exhaust line 42.

Accordingly, high pressure compressed air, which is about 100 to 150 p.s.i., from a reservoir 43, which may be a reservoir on a truck for supplying air to the braking system, for example, can be supplied to the line 41 only when there is a vacuum in the line 38. Since the vacuum in the line 38 can occur only when the container 10 is not filled with gasoline to a level at which the opening 33 in the body 24 of the level sensor 19 is blocked, the level sensor 19 insures that there can be no supply of compressed air to the line 41 for actuating the valve 11 and the vent 16 when the container 10 is filled with the gasoline to the predetermined level.

The reservoir 43 is connected to the compressor 28 through a check valve 44. This prevents any bleeding of the compressed air in the reservoir 43 to the reservoir 26 since the level sensor 19 continuously bleeds the low pressure compressed air as long as the load valve 27 is open. One suitable example of the check valve 44 is sold by Circle Seal Products, Inc., Anaheim, California as series 2200.

The high pressure compressed air is supplied through a lubricator 45 prior to passing through the fluidic interface valve 39. The lubricator 45 supplies an oil mist to the various valves and cylinders in the system to keep them lubricated. In some instances, the lubricator 45 may not be required. One suitable example of the lubricator 45 is sold by Bastin-Blessing Company, Chicago, Illinois under the tradename Rego as model 8843M.

When there is a vacuum in the line 38, the high pressure compressed air from the reservoir 43 is supplied from the line 41 through a line 46 to a shuttle valve 47. The shuttle valve 47 is a three-port valve having two inlets and one outlet. One suitable example of the shuttle valve 47 is sold by Versa of Englewood, New Jersey as model SV3.

When the high pressure compressed air is supplied to the line 46, it shifts the shuttle valve 47 so that the compressed air flows thorugh its outlet to a line 48 whereby the high pressure compressed air is supplied to the vent 16 and the valve 11. When this occurs, the valve 11 and the vent 16 are opened whereby gasoline can flow into the interior of the container 10 through the valve 11 and the container 10 is vented through the vent 16.

At the same time that the compressed air is supplied through the lines 41 and 46 to the shuttle valve 47, the compressed air also flows from the ine 41 through a line 49 to the load valve 27. The supply of the compressed air through the line 49 to the load valve 27 holds the load valve 27 in the position in which communication between the lines 30 and 25 occurs without requiring the operator to hold the palm buttom 31 in its pulled position.

Accordingly, to load the container 10 with gasoline, it is only necessary for the operator to pull the palm button 31 out of the load valve 27 whereby low pressure compressed gas flows through the line 25 to the level sensor 19. As long as the level sensor 19 is functioning properly and the level of the gasoline in the container 10 has not reached the predetermined level at which gasoline enters the opening 33 to block communication between the passages 23 and 34, a vacuum will occur in the line 38 whereby the fluidic interface valve 39 is positioned to allow high pressure compressed air to flow from the line 40 to the line 41 and then to the line 48 to open the vent and the valve 11.

If there should be any failure or improper functioning of the level sensor 19, then a vacuum will not exist in the line 38 even though the gasoline in the container 10 has not reached the predetermined level. Thus, it is not necessary to precheck the level sensor 19 since there can be no filling of the container 10 if the level sensor 19 is not functioning properly. Similarly, if the container 10 is filled with gasoline to the predetermined level, there is no vacuum in the line 38 whereby there again is no opening of the vent 16 or the valve 11.

Figure 3:
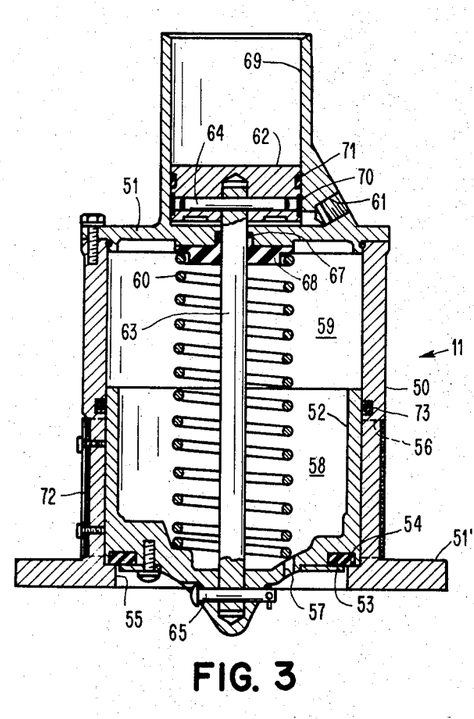
FIG. 3 is a sectional view of a valve for controlling flow of liquid into the container or tank of the system of FIG. 1.

As shown in FIG. 3, the valve 11 includes a body 50 having its upper end closed by a cap 51 and a flange 51' at its lower end for securing to the bottom of the container 10. The body 50 has a piston 52 slidably mounted therein. The piston 52 has an annular seal 53 in its lower end for sealing engagement with an annular machined face 54 of the body 50. This blocks an opening 55 in the body 50 to prevent flow of gasoline from the elbow 12 through circumferentially spaced openings 56 in the body 50 to the interior of the container 10 when the piston 52 is in the position of FIG. 3.

When the piston 52 is in the position of FIG. 3, gasoline can enter into the interior of the piston 52 through a small opening 57 in the bottom of the piston 52. The piston 52 defines a chamber 58, which is smaller than a chamber 59 formed by the body 50 above the piston 52. Both of the chambers 58 and 59 are filled with gasoline through the opening 57 when the piston 52 is in the position of FIG. 3.

Since the area of the chamber 59 is larger than the area of the openings 55, a differential pressure produced by the gasoline acting on opposite sides of the piston 52 results in a greater force acting on the piston 52 in a downward direction to urge the piston 52 to its closed position. Additionally, a compression spring 60 urges the piston 52 to its closed position of FIG. 3. Accordingly, the introduction of gasoline to the elbow 12 will not cause the piston 52 to move upwardly to allow gasoline to flow from the opening 55 through the openings 56 into the interior of the container 10 but will merely aid in holding the piston 52 in its closed position of FIG. 3.

Thus, the valve 11 allows flow to the interior of the container 10 only when high pressure compressed air is supplied from the line 48 through a port 61 in the body 50 to act on the bottom surface of piston 62, which is connected by a valve stem 63 to the piston 52, to move the piston 62 upwardly. When the high pressure compressed air is supplied through the line 48 to the port 61, the piston 52 is moved upwardly to allow communication between the opening 55 and the circumferentially spaced openings 56 whereby gasoline flows into the interior of the container 10 at its bottom. As the piston 52 is moved upwardly, the opening 57 allows the gasoline, which is within the chambers 58 and 59, to escape therefrom since the volume of the chambers 58 and 59 is significantly reduced.

The piston 62 is connected to the valve stem 63 by a dowel pin 64. The piston 52 is connected to the valve stem 63 by a pin 65. Accordingly, any upward or downward movement of the piston 62 is transmitted to the piston 52.

As the stem 63 passes through the cap 51, a seal 67, which is retained in position in the cap 51 by a retainer 68, prevents any communication between the chamber 59 and the chamber in the cap 51 into which the compressed air is introduced through the port 61. Thus, there is no communication of the compressed air with the gasoline whereby there is no waste of the high pressure compressed air.

The piston 62 slides within a bore 69, which is Teflon coated for the reduction of friction, in the cap 51. The piston 62 has a Teflon bearing tape 70, which is sold under the tradename Rulon, around its circumference.

The piston also has a seal 71 mounted therein to prevent leakage of air between the piston 62 and the cap 51. The seal 71 also prevents the flow of gasoline from the interior of the container 10 into the chamber in the cap 51 in which the compressed air is introduced through the port 61.

The body has a screen 72 secured thereto to cover the circumferentially spaced openings 56. This prevents foreign materials from damaging the face 54, which forms the valve seat, of the body 50.

When the compressed air ceases to be supplied through the port 61 and is vented through the line 48, the spring 60 urges the piston 52 to the closed position of FIG. 3. The opening 57 controls the speed at which the piston 52 closes by having its size selected so that it functions as a dashpot. This prevents line shocks from instantaneous closing of the piston 52 due to trying to stop the momentum of the gasoline instantaneously since the gasoline is flowing at the rate of about 700 gallons per minute. At this flow rate, it takes approximately four to five seconds to close the valve 11 when the compressed air is removed from the port 61.

The body 50 has an annular seal 73 supported therein for cooperation with the outer surface of the slidably mounted piston 52. The seal 73 is positioned so that it cooperates with the piston 52 irrespective of whether the piston is in the closed position of FIG. 3 or in its open position.

Figure 2:
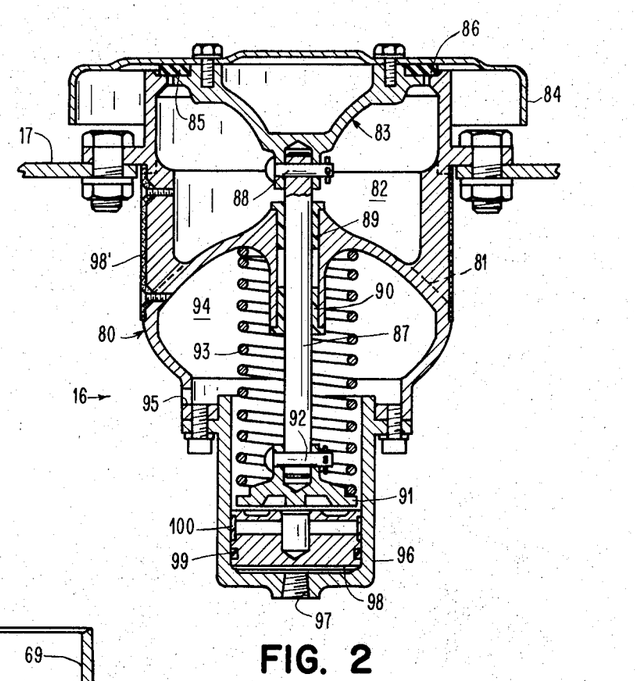
FIG. 2 is a sectional view of a vent used on the tank with the system of FIG. 1.

As shown in FIG. 2, the vent 16 includes a body 80, which is secured to the top wall 17 of the container 10. The body 80 has circumferentially spaced openings 81 in its side wall to provide communication from the interior of the container 10 to a chamber 82, which is formed between the body 80 and a deflector 83. the deflector 83, which is slidably mounted on the body 80, has a cover 84 secured thereto so that the deflector 83 and the cover 84 cooperate to hold an annular seal 85 therebetween for sealing against a machined annular face 86 of the body 80.

As long as the seal 85 seats against the face 86 of the body 80, the interior of the container 10 is sealed by the vent 16. However, when the deflector 83 and the cover 84 are moved upwardly so that the seal 85 no longer engages the face 86 of the body 80, the interior of the container 10 is vented.

The lower end of the deflector 83 has the upper end of a stem 87 secured thereto by a pin 88. The stem 87 extends through a pair of bushings 89 and 90, which are supported by the body 80, and has its lower end secured to a spring retainer 91 by a pin 92. A compression spring 93 is disposed between the upper surface of the spring retainer 91 and a portion of the body 80 supporting the bushings 89 and 90. The compression spring 93 continuously urges the deflector 83 to the position of FIG. 2 in which the seal 85 seats against the face 86 of the body 80 to prevent any flow communication for the interior of the container 10 to the atmosphere.

The spring 93 is disposed in a chamber 94 in the body 80. The body 80 has a drain hole 95 in its side wall to provide communication between the chamber 94 and the interior of the container 10 so that both have the same pressure. The drain hole 95 enables gasoline to flow from the chamber 94 during unloading if the level of the gasoline in the container 10 becomes such that the gasoline enters the chamber 94.

The lower end of the body 80 has an air cylinder 96 secured thereto. When high pressure compressed air from the line 48 is introduced into a port 97 in the bottom of the air cylinder 96, a piston 98, which is slidably mounted in the air cylinder 96, is moved upwardly to engage the lower end of the spring retainer 91. The upward movement of the piston 98 by the high pressure compressed air introduced through the port 97 results in the deflector 83 being moved upwardly so that the seal 85 no longer engages the face 86 of the body 80 whereby the container 10 is vented through the openings 81, which are covered by a screen 98' to prevent foreign matter from entering the container 10, in the body 80 and the chamber 82. Thus, whenever compressed air is supplied through the line 48 to the port 97 in the air cylinder 96, the interior of the container 10 is vented.

To prevent leakage of the high pressure compressed air around the piston 98, a seal 99 is mounted in the piston 98 for cooperation with the inner wall of the air cylinder 96. The piston 98 also has a Teflon bearing tape 100, which is sold under the tradename Rulon, around its circumference to reduce friction between the piston 98 and the inner wall of the air cylinder 96.

If the piston 98 should become stuck in the air cylinder 96 so that it fails to move the deflector 83 upwardly to open the vent 16 or the compressed air to the port 97 should fail for any reason, the deflector 83 will still move upwardly when the pressure in the interior of the container 10 exceeds a predetermined pressure. This is because the spring 93 is designed to exert a force to maintain the deflector 83 so that the seal 85 engages the face 86 of the body until the pressure is 3 p.s.i. in the interior of the container 10. When this occurs, the deflector 83 will move slightly upwardly so as to provide a crack through which the interior of the container 10 is vented. When the pressure in the interior of the container 10 reaches 5 p.s.i., the deflector 83 is moved upwardly its maximum extent so that there is a full opening of the vent 16.

The maximum upward movement of the deflector 83, irrespective of whether it is moved by the piston 98 or by the pressure in the interior of the container 10, is determined by engagement of the upper end of the spring retainer 91 with the lower end of the bushing 90. Thus, the maximum upward movement of the deflector 83 is controlled.

The independent upward movement of the deflector 83 relative to the piston 98 is possible because there is no mechanical connection between the spring retainer 91 and the piston 98. Thus, the spring retainer 91 can move freely upwardly relative to the piston 98 if the piston 98 should fail to move upwardly.

By appropriately sizing the spring 93, the deflector 83 remains in a position in which the seal 85 seats against the face 86 of the body 80 if the tank truck having the container 10 should turn over because the pressure of the gasoline within the interior of the container 10 with the truck rolled over would be approximately 2 p.s.i. At this pressure, the force of the spring 93 is sufficient to hold the deflector 83 in the closed position whereby there can be no leakage of gasoline from the interior of the container 10 through the vent 16.

With the valve 11 and the vent 16 open, gasoline flows into the container 10 until the level of the gasoline in the container 10 enters the opening 33 in the sensor body 24. When this occurs, the flow of compressed air from the passage 23 to the aligned passage 34 is blocked, and the vacuum ceases to exist within the line 38. This causes movement of the resiliently biased diaphragm of the fluidic interface valve 39 to change the position of the three-way valve whereby the flow of high pressure compressed air from the passage 40 to the passage 41 is stopped, and the passage 41 now communicates with the exhaust line 42 whereby the compressed air acting on the load valve 27 is exhausted through the line 42 so that the load valve 27 is moved by its spring to block the flow of low pressure compressed air from the line 30 to the line 25.

With the line 41 connected to the line 42, high pressure compressed air is vented from the line 48 to atmosphere through the lines 46, 41, and 42. The removal of the high pressure compressed air from the line 48 results in the valve 11 and the vent 16 closing.

In addition to being able to automatically stop the flow of gasoline to the container 10 when the level in the container 10 reaches a predetermined level, the flow of gasoline to the container 10 also can be manually stopped. This is accomplished by pushing inwardly the palm buttom 31 to shift the load valve 27 against the force of the compressed air in the line 49 so that the flow of low pressure compressed air from the line 30 to the line 25 is stopped. This results in the vacuum ceasing to exist in the line 38 whereby the three-way valve of the fluidic interface valve 39 has its position changed so as to block flow from the line 40 to the line 41 and to connect the line 41 to atmosphere through the line 42.

When this occurs, the line 48 is vented to atmosphere through the lines 46, 41, and 42. This also vents the pressure from the load valve 27 although the load valve 27 has already been moved to a closed position by manual movement of the palm button 31.

The container 10 also can be automatically unloaded with the system of FIG. 1. To unload the container 10, it is only necessary to open the valve 11 and the vent 16, and it is not necessary for the level sensor 19 to be operative at this time.

Accordingly, an unload valve 101, which is a three-way, two-position manually operated spring return mechanical valve, is employed. One suitable example of the unload valve is sold by Mead Fluid Dynamics Division of Stanray Corporation, Chicago, Illinois as model MV-70P.

The unload valve 101 has an inlet port connected by a line 102 to the line 40, which contains the high pressure compressed air from the reservoir 43. When a lever 103 of the unload valve 101 is actuated to shift the valve position, the line 102 communicates through a line 104 with an inlet port of the shuttle valve 47. The high pressure compressed air shifts the shuttle valve 47 so that high pressure compressed air can flow from the line 104 to the line 48 to open the valve 11 and the vent 16.

When it is desired to stop unloading of the container 10, it is only necessary to release the lever 103 to shift the unload valve 101 so tha the line 104 no longer communicates with the line 102 but now communicates with an exhaust line 105, which is connected to the atmosphere. Thus, the high pressure compressed air is exhausted from the line 48 through the lines 104 and 105.

Considering the operation of the system of FIG. 1, loading of the container 10 with gasoline is started by pulling the palm button 31 of the load valve 27 outwardly. This supplies low pressure compressed air from the line 30 through the line 25 to the level sensor 19.

If the sensor is functioning properly and the level of the gasoline in the container 10 has not reached the predetermined level whereby the flow of the low pressure compressed air from the passage 23 to the passage 34 is interrupted by gasoline entering the opening 33 in the sensor body 24, a vacuum is created in the line 38. This shifts the resiliently biased diaphragm of the fluidic interface valve 39 so that the lines 40 and 41 are connected.

With the lines 40 and 41 connected, high pressure compressed air from the reservoir 43 shifts the shuttle valve 47 to supply high pressure compressed air to the line 48 whereby the valve 11 and the vent 16 are opened simultaneously. This results in gasoline starting to flow into the interior of the container 10 through the opened valve 11. At the same time, high pressure compressed air from the line 41 flows through the line 49 to the load valve 27 to pneumatically hold the load valve 27 open so that low pressure compressed air continues to flow from the line 30 to the line 25. This enables the operator to cease to have to hold the palm button 31 of the load valve 27 in its outward position against the force of the spring.

The gasoline will continue to flow into the container 10 until it reaches a predetermined level in the container 10. When this occurs, gasoline in the opening 33 in the sensor body 24 blocks the flow of low pressure compressed air from the passage 23 to the aligned passage 34 whereby the vacuum ceases to exist in the line 38. As a result, the fluidic interface valve 39 shifts position so that the line 41 no longer communicates with the line 40 but communicates with the exhaust line 42. This results in the line 48 being vented so that the valve 11 and the vent 16 automatically close with the container 10 having the desired quantity of gasoline therein. The load valve 27 also automatically closes when the fluidic interface valve 39 shifts position to connect the line 41 with the exhaust line 42 since the line 49 now is vented.

If it is desired to stop the flow of gasoline to the container 10 before it is filled, it is only necessary for the operator to push in the palm button 31. This overcomes the force of the pneumatic pressure in the line 49 so that the load valve 27 now blocks the flow of low pressure compressed air from the line 30 to the line 25. When this occurs, the valve 11 and the vent 16 are automatically closed since the fluidic interface valve 39 again shifts position due to the lack of a vacuum in the line 38.

When it is desired to unload the system, it is only necessary to actuate the lever 103 of the unload valve 101 whereby high pressure compressed air is supplied from the line 102 through the line 104 to open the shuttle valve 47 and from the opened shuttle valve 47 to the line 48 to open the valve 11 and the vent 16. Unloading of the container 10 continues until the lever 103 is moved to block communication between the lines 102 and 104. When this occurs, the flow of gasoline from the container 10 automatically ceases.

Figure 6:
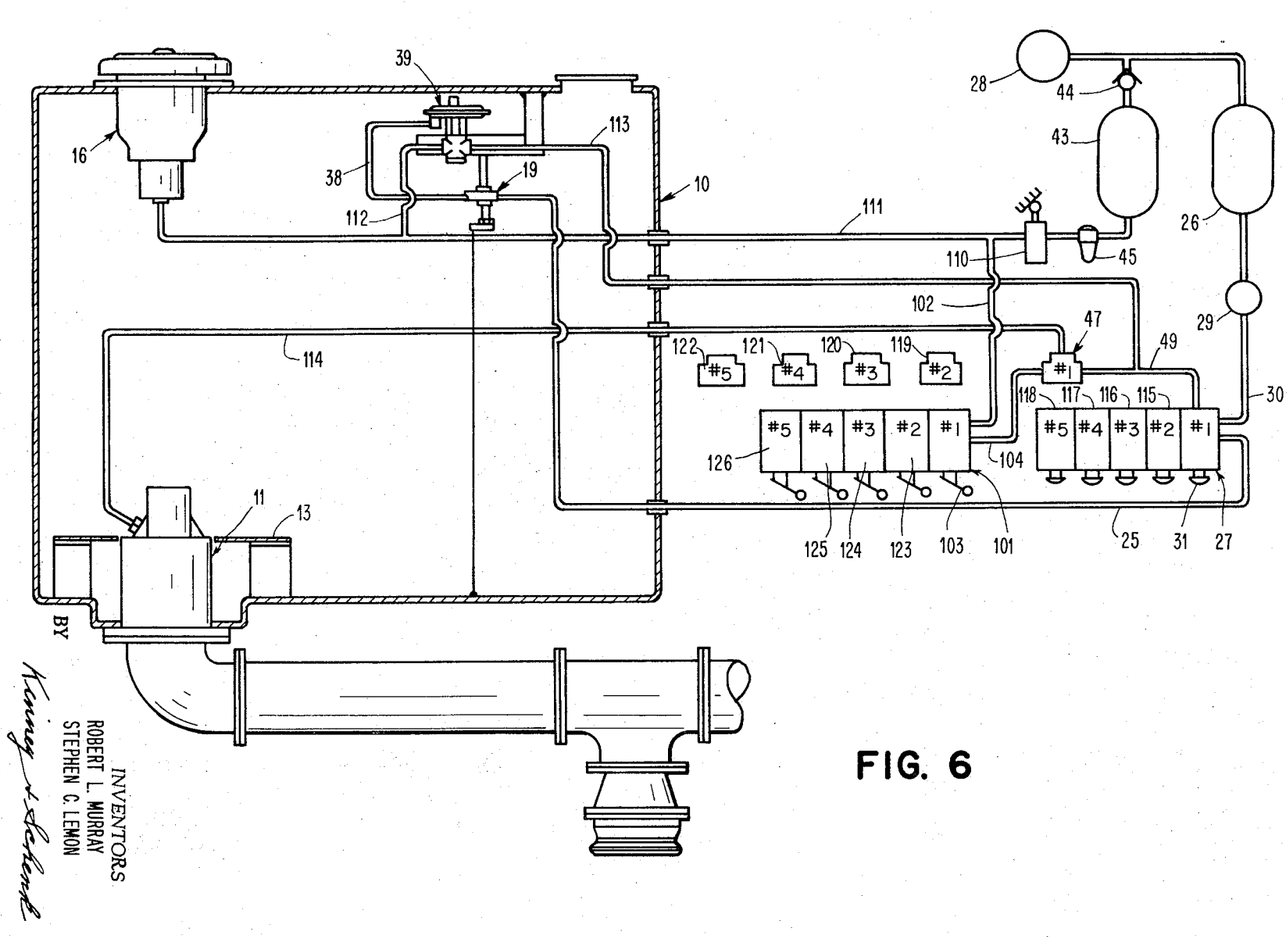
FIG. 6 is a schematic view of another embodiment of the loading and unloading system of the present invention.

Referring to FIG. 6, there is shown another form of the system of the present invention in which the vent 16 is opened by high pressure compressed air before the load valve 27 or the unload valve 101 is activated. Thus, the vent 16 opens before the valve 11 in the modification of FIG. 6.

Furthermore, the fluidic interface valve 39 is supported within the container 10 rather than exterior of the container 10 as in the system of FIG. 1. Of course, if desired, the fluidic interface valve 39 could be supported exterior of the container 10 in this embodiment, and the fluidic interface valve 39 could be supported within the container 10 in the system of FIG. 1.

The system of FIG. 6 also discloses the container 10 being divided into five compartments. The load valve 27, the shuttle valve 47, and the unload valve 101 are connected to the various piping for only compartment No. 1 as shown in FIG. 6.

The outlet of the high pressure air reservoir 43 is connected through an interlock panel valve 110 and a line 111 to the vent 16. The valve 110 can be arranged to be opened in any suitable manner by the operator. For example, the valve 110 could be opened whenever a control panel door is opened to provide access to the load valve 27 and the unload valve 101, for example. This would insure that the vent 16 is opened before either the load valve 27 or the unload valve could be actuated.

The low pressure compressed air is supplied from the reservoir 26 through the lines 30 and 25 to the level sensor 19 in the same manner as described for FIG. 1. Thus, it is only necessary to pull out the palm buttom 31 to supply low pressure compressed air to the level sensor 19. If the level of the gasoline in the compartment of the container 10 has not reached the predetermined level and the level sensor 19 is functioning properly, a vacuum is created in the line 38 so that the fluidic interface valve 39 is disposed to allow high pressure compressed air to flow from the line 111 through a line 112 to the valve 39 and from the valve 39. to a line shuttle valve 47 and the load valve 27 in the manner previously described for the system of FIG. 1.

When the shuttle valve 47 is opened, high pressure compressed air flows therefrom through a line 114 to only the valve 11. This opens the valve 11 so that gasoline can flow into the compartment No. 1 of the container 10.

The flow of the gasoline into the compartment No. 1 of the container 10 through the valve 11 can be stopped by manually actuating the palm button 31 of the load valve 27 through depressing it. The flow of gasoline to the compartment No. 1 of the container 10 is automatically stopped when the gasoline in the compartment No. 1 of the container 10 reaches the predetermined level at which the sensor 19 in the compartment No. 1 ceases to supply a vacuum to the line 38.

The vent 16 remains open until the valve 110 is closed by returning the control panel door, for example, to the position in which there can be no access to the load valve 27 or the unload valve 101. Thus, the vent 16 cannot be closed until flow of gasoline to or from the container 10 is stopped.

When it is desired to unload the compartment No. 1 of the container 10, it is necessary to first open the interlock panel valve 110. As previously mentioned, this is accomplished by opening the control panel door, for example, through which access to the lever 103 of the unload valve 101 may be obtained. As soon as the valve 110 is opened, the vent 16 is opened due to high pressure compressed air being supplied through the line 111.

With the valve 110 open, the actuation of the lever 103 of the unload valve 101 provided communication between the lines 102 and 104 whereby the shuttle valve 47 is shifted to provide high pressure compressed air through the line 114 to the valve 11. This opens the valve 11 so that the gasoline within the compartment No. 1 in the container 10 can be removed therefrom.

The flow from the compartment No. 1 of the container 10 is stopped when the lever 103 of the unload valve 101 is again actuated to block communication between the lines 102 and 104 and to connect the line 104 with the exhaust line 105 (see FIG. 1) to vent the compressed air in the line 104 to the atmosphere. With the line 104 vented, the flow of high pressure compressed air to the line 114 is stopped whereby the valve 11 closes. This stops the flow of gasoline from the compartment No. 1 of the container 10.

The vent 16 is closed only when the valve 110 is closed. Thus, it is again necessary to close the control panel door or other mechanism, which regulates the position of the valve 110, before the vent 16 is closed.

As schematically shown in FIG. 6, there are four additional load valves 115, 116, 117, and 118, which are the same as the load valve 27. The load valves 115, 116, 117, and 118 are for use in controlling the supply of gasoline to compartments Nos. 2, 3, 4, and 5 (not shown), respectively, of the container 10.

Similarly, the compartments Nos. 2, 3, 4, and 5 of the container 10 have shuttle valves 119, 120, 121, and 122, respectively. Each of the shuttle valves 119 to 122 is the same as the shuttle valve 47.

The compartments Nos. 2, 3, 4, and 5 of the container 10 have unload valves 123, 124, 125, and 126, respectively. The unload valves 123 to 126 are the same as the unload valve 101.

Figure 7:
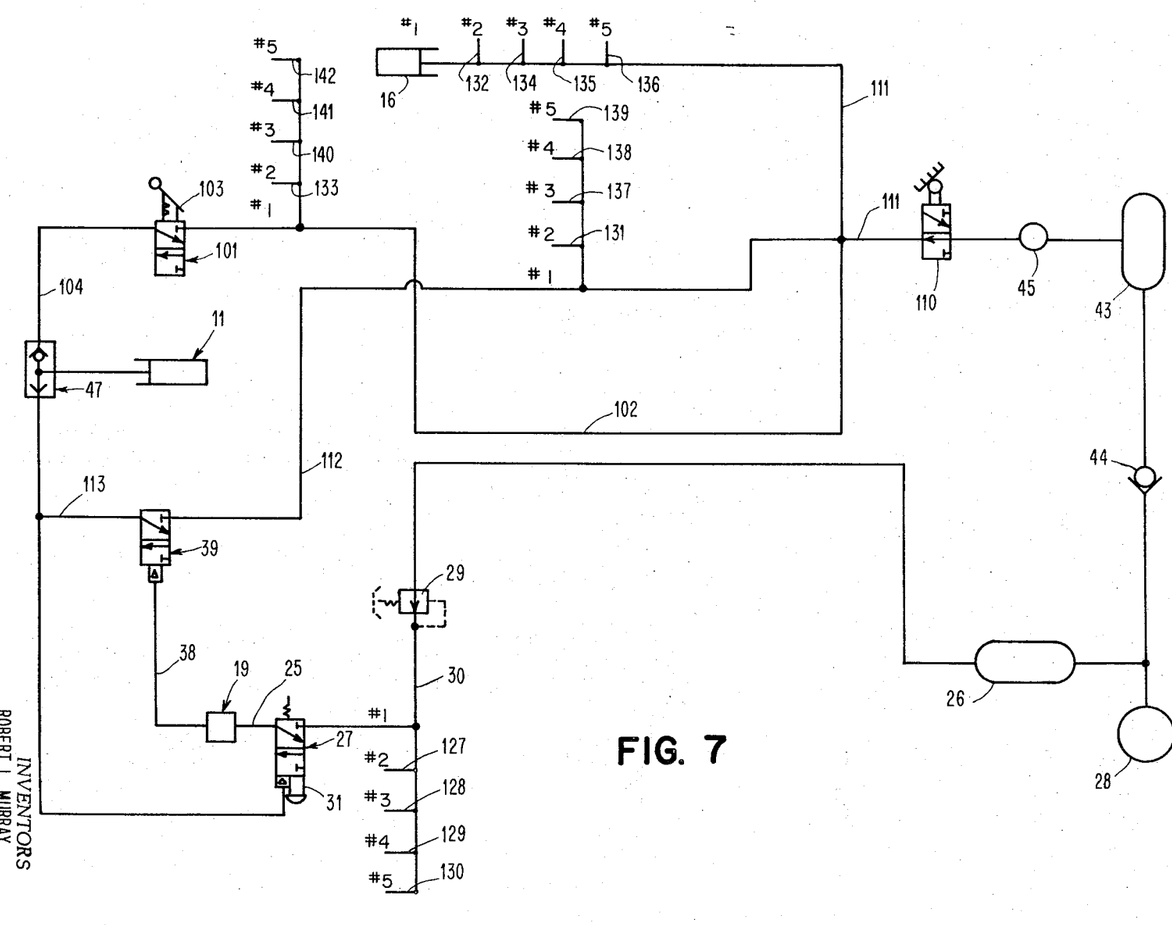
FIG. 7 is a schematic diagram showing the flow of compressed air in the system of FIG. 6.

The load valves 115, 116, 117, and 118 are connected to the air reservoir 26 and the regulator 29 by the line 30 through lines 127, 128, 129, and 130, respectively, as shown in FIG. 7. For clarity purposes, the load valves 115-118 are not shown in FIG. 7. Each of the load valves 115, 116, 117, and 118 also communicates with a level sensor (not shown), which is the same as the level sensor 19, in the compartment of the container 10 with which the load valve is employed.

In addition to being connected to the level sensor for the particular compartment with which the load valve is used to control loading, each of the load valves 115 to 118 also is connected to the shuttle valve for the particular compartment for which the load valve is associated in the same manner as the load valve 27 is connected to the shuttle valve 47. Thus, the load valve 115 is connected to the shuttle valve 119, the load valve 116 is connected to the shuttle valve 120, the load valve 117 is connected to the shuttle valve 121, and the load valve 118 is connected to the shuttle valve 122.

The level sensor for each of the compartments Nos. 2, 3, 4, and 5 of the container 10 communicates with a fluidic interface valve, which is the same as the fluidic interface valve 39 in the compartment No. 1 of the container 10, in the same manner as the level sensor 19 communicates with the fluidic interface valve 39 in the compartment No. 1 of the container 10. Thus, the level sensor in the compartment No. 2 communicates with a fluidic interface valve in the compartment No. 2, the level sensor in the compartment No. 3 communicates with a fluidic interface valve in the compartment No. 3, the level sensor in the compartment No. 4 communicates with a fluidic interface valve in the compartment No. 4, and the level sensor in the compartment No. 5 communicates with a fluidic interface valve in the compartment No. 5.

Accordingly, when the level sensor in the compartment No. 2 of the container 10 produces a vacuum after the load valve 115 has been actuated by pulling the palm button 31 outwardly, high pressure compressed air can be supplied from the line 111 through a line 131 to the fluidic interface valve in the compartment No. 2 and from the fluidic interface valve to open the shuttle valve 119 in the compartment No. 2. As a result of the shuttle valve 119 opening, the high prssure compressed air flows from the shuttle valve 119 to a flow control valve, which is the same as the valve 11 and controls flow into and out of the compartment No. 2. When this occurs, the compartment No. 2 of the container 10 can be filled with gasoline. Of course, to actuate the palm button 31 of the load valve 115, it is necessary to open the valve 110 whereby a vent, which is like the vent 16, for the compartment No. 2 is opened since it communicates with the line 111 thorugh a line 132.

When it is desired to unload gasoline from the compartment No. 2 of the container 10, it is only necessary to actuate the lever 103 of the unload valve 123 whereby the shuttle valve 119 is positioned to allow high pressure compressed air to flow from the line 102 through a line 133 to the unload valve 123 and from the unload valve 123 through the shuttle valve 119 to the flow control valve in the compartment No. 2. Of course, to actuate the unload valve 123, the control panel door must have been opened so that the valve 110 would be open to open the vent in the compartment No. 2 through the lines 111 and 132 before opening of the flow control valve.

Similarily, the compartments Nos. 3, 4, and 5 of the container 10 have valves, which are the same as the valve 11, for controlling flow into and out of the compartment of the container 10 with which the valve is associated. The compartments Nos. 3, 4, and 5 of the container 10 have vents, which are the same as the vent 16, to vent the compartment of the container 10 with which the vent is associated. The vents of the compartments Nos. 3, 4, and 5 are connected to the line 111 by lines 134, 135, and 136, respectively.

It should be understood that the fluidic interface valve in the compartments Nos. 3, 4, and 5 of the container 10 are connected to the line 111 through lines 137, 138, and 139, respectively. It also should be understood that the unload valves 124, 125, and 126 are connected to the line 102 by lines 140, 141, and 142, respectively.

It should be understood that the container 10 may have any number of compartments formed therein. Thus, the dividing of the container 10 into five compartments is only exemplary.

Figure 8:
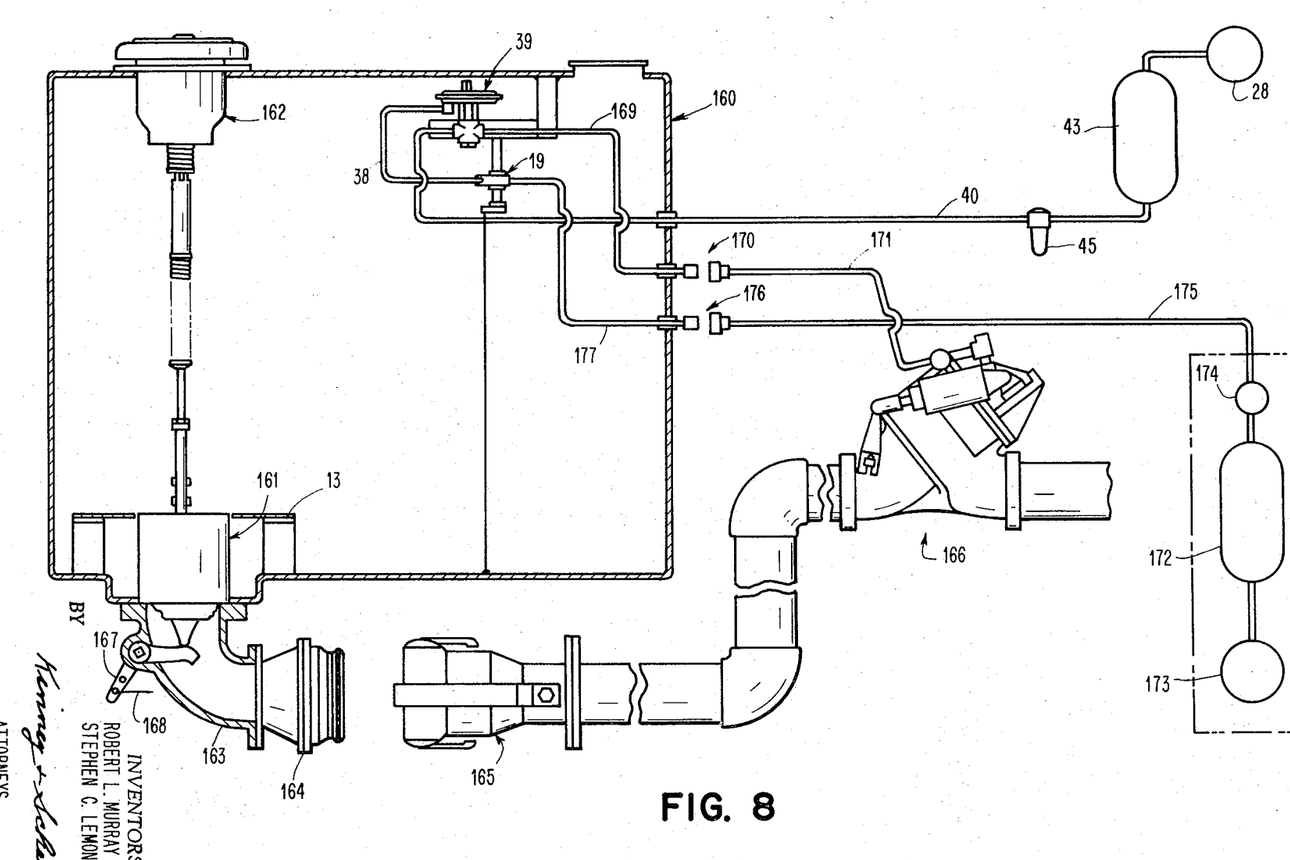
FIG. 8 is a schematic view of another form of the loading and unloading system of the present invention.

Referring to FIG. 8, there is shown another system for loading and unloading a container 160, which is like the container 10, from the bottom. The container 160 has a valve 161 in its bottom for controlling the flow of gasoline into or out of the container 160. The valve 161 is mechanically actuated rather than being pneumatically actuated as in the systems of FIGS. 1 and 6.

The container 160 has a vent 162 at its upper end for venting the interior of the container 160. The vent 162 is mechanically actuated rather than being pneumatically actuated as in the systems of FIGS. 1 and 6.

The valve 161 has an elbow 163 connected thereto. While the elbow 163 is shown as being formed integral (see FIG. 1) with the valve 161, it should be understood that it may be separate and attached to the valve 161.

The elbow 163 has a Kamvalok adapter 164 secured thereto for cooperation with a Kamvalok coupler 165, which may be connected through a valve 166 to a source of gasoline. Accordingly, when the coupler 165 is connected to the adapter 164 and the valves 166 and 161 are opened, gasoline can be supplied to the interior of the container 160 through the bottom thereof.

To unload gasoline from the container 160, the adapter 164 may be connected to another coupler (not shown). Of course, the valve 161 must be open.

The valve 161 and the vent 162 are mechanically opened by manually rotating a lever 167 by pulling a cable 168 attached to the lever 167. The valve 166 can be opened only when high pressure compressed air is supplied from the fluidic interface valve 39, which is supported within the container 160 although it could be mounted exterior of the container 160 is desired, through a line 169, a coupling 170, and a line 171. The high pressure compressed air is supplied to the fluidic interface valve 39 from the truck reservoir 43 by the line 40 in the same manner as previously described for the system of FIG. 1.

The fluidic interface valve 39 allows communication between the lines 40 and 169 as long as the level sensor 19 produces a vacuum in the line 38 in the manner previously mentioned with respect to FIG. 1. In this system, the low pressure compressed air is supplied to the level sensor 19 from a reservoir 172, which receives the compressed air from a compressor 173, through a regulator 174 to a line 175. The line 175 is connected by a coupling 176, which has a two-way valve therein to prevent escape of the low pressure compressed air from the line 175 unless the coupling 176 is connected with a line 177; the line 177 leads to the passage 23 in the body 24 of the level sensor 19. Thus, this embodiment utilizes a separate compressor for supplying the low pressure compressed air.

Accordingly, the valve 166 is opened if the couplings 170 and 176 are coupled to the lines 169 and 177, respectively, the level of the gasoline in the container 160 has not reached the predetermined level so as to prevent the existence of a vacuum in the line 38, and the level sensor 19 is functioning. However, the opening of the valve 166 will not cause the gasoline to flow into the container 160. Instead, it also is necessary for the valve 161 to be opened.

Figure 9:
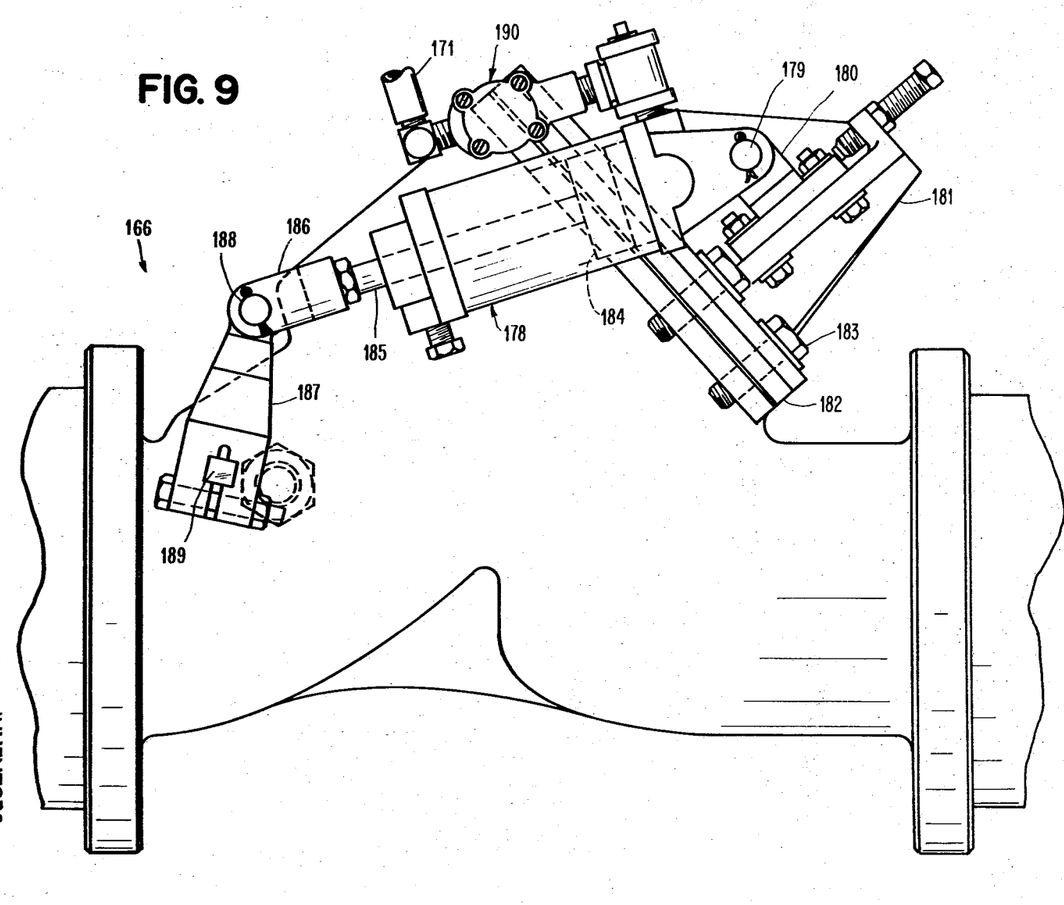
FIG. 9 is an enlarged elevational view of a loading valve used in the system of FIG. 8.

Referring to FIG. 9, the valve 166 is shown as having as air cylinder 178, which has the high pressure compressed air supplied thereto through the line 171, pivotally mounted by a pin 179 on a pivot block 180. The pivot block 180 is supported on a bracket 181, which is secured to a cap 182 of the housing of the valve 166 by bolts 183. One suitable example of the air cylinder 178 is sold by the Sheffer Corporation, Cincinnati, Ohio as model C20 series.

The air cylinder 178 has a piston 184 slidably mounted therein with the end of its rod 185 secured to a clevis 186. The clevis 186 has an operating arm 187 pivotally connected thereto by a clevis pin 188. The operating arm 187 is fastened to a square shaped stem 189 of the valve 166. The stem 189 extends into the housing of the valve 166 and operates a cam type lever, which lifts a poppet to allow flow through the valve 166; the poppet is biased by a spring to its closed position. In addition to the force of the spring acting on the poppet, the direction of flow of gasoline also urges the poppet to its closed position.

Accordingly, when high pressure compressed air is supplied through the line 171 to the air cylinder 178 so as to move the piston 184 to the left in FIG. 9 whereby there is counterclockwise rotation of the operating arm 187, the valve 166 is opened. When high pressure compressed air is no longer supplied through the line 171, the forces of the spring acting on the poppet and the gasoline flowing through the valve 166 move the poppet to its closed position by rotating the operating arm 187 clockwise.

When the line 171 is vented due to the position of the fluidic interface valve 39 because of the vacuum ceasing to exist in the line 38, the speed of the release of the compressed air from acting on the piston 184 is increased by employing a quick exhaust valve 190. One suitable example of the quick exhaust valve is sold by Mead Fluid Dynamics Division of Stanray Corporation, Chicago, Illinois as model No. 1.

The quick exhaust valve 190 operates on a pressure differential principle whereby the valve shifts to exhaust the interior of the air cylinder 178 directly to the atmosphere rather than by means of the exhaust line of the fluidic interface valve 39 when the pressure in the line 171 becomes a certain amount lower than the pressure in the air cylinder 178. As a result, venting does not take as long because the air does not have to travel the lengths of the line 171, the coupling 170, and the line 169 to exhaust but can exhaust at the valve 190.

Accordingly, the valve 166 can be opened only when the gasoline in the container 160 has not reached the predetermined level and the level sensor 19 is properly functioning. Thus, there is no need to visually inspect the level of the gasoline in the container 160 to ascertain whether it can have any more gasoline added thereto. Likewise, there is no need to precheck the level sensor 19 since its failure to operate will prevent the supply of any gasoline to the container 160.

Even though the valve 166 is opened, there can still be no flow into the container 160 unless the valve 161 is opened. As previously mentioned, the vlave 161 is manually opened by pulling on the cable 168 to rotate the lever 167. The lever 167 is secured to one end of a shaft 191 (see FIGS. 10 and 11), which is rotatably supported by the elbow 163. A cam 192 also is secured to the shaft 191 so that counterclockwise rotation of the lever 167 lifts the cam 192 upwardly against a cam follower 193, which is secured to the lower end of a stem 194 by a pin 195. The upper surface of the cam follower 193 bears against the bottom of a piston 196, which is slidably mounted in a body 197 of the valve 161.

Figures 10, 11:
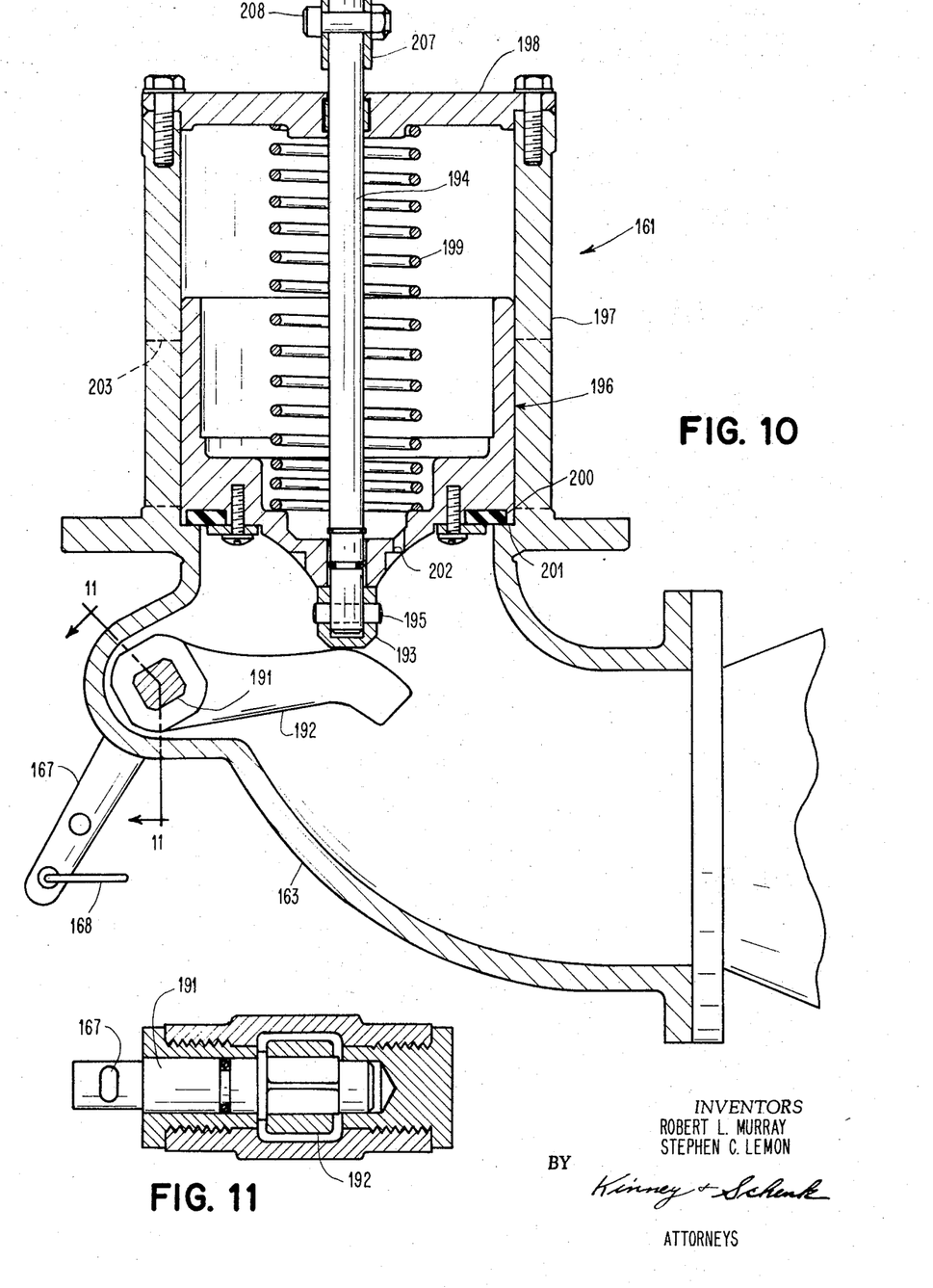
FIG. 10 is an enlarged fragmentary sectional view of a valve for controlling the flow of liquid into the bottom of the container in the system of FIG. 8.
FIG. 11 is a sectional view of a portion of the structure of FIG. 10 and taken along line 11—11 of FIG. 10.

The upper end of the body 197 is closed by a cap 198 with a compression spring 199 acting between the cap 198 and the piston 196 to urge the piston 196 to the position of FIG. 10 in which an annular seal 200 on the bottom of the piston 196 seats against a machined annular face 201 of the body 197. In this position of the piston 196, flow into the container 160 is prevented.

The piston 196 has an opening 202 in its bottom. The opening 202 functions for the same purpose as the opening 57 in the piston 52 of FIG. 3.

When the piston 196 is moved upwardly by counterclockwise rotation of the lever 167, gasoline can flow from the elbow 163 through circumferentially spaced openings 203 in the body 197 into the interior of the container 160. Of course, the valve 166 also must be open.

Figure 12:
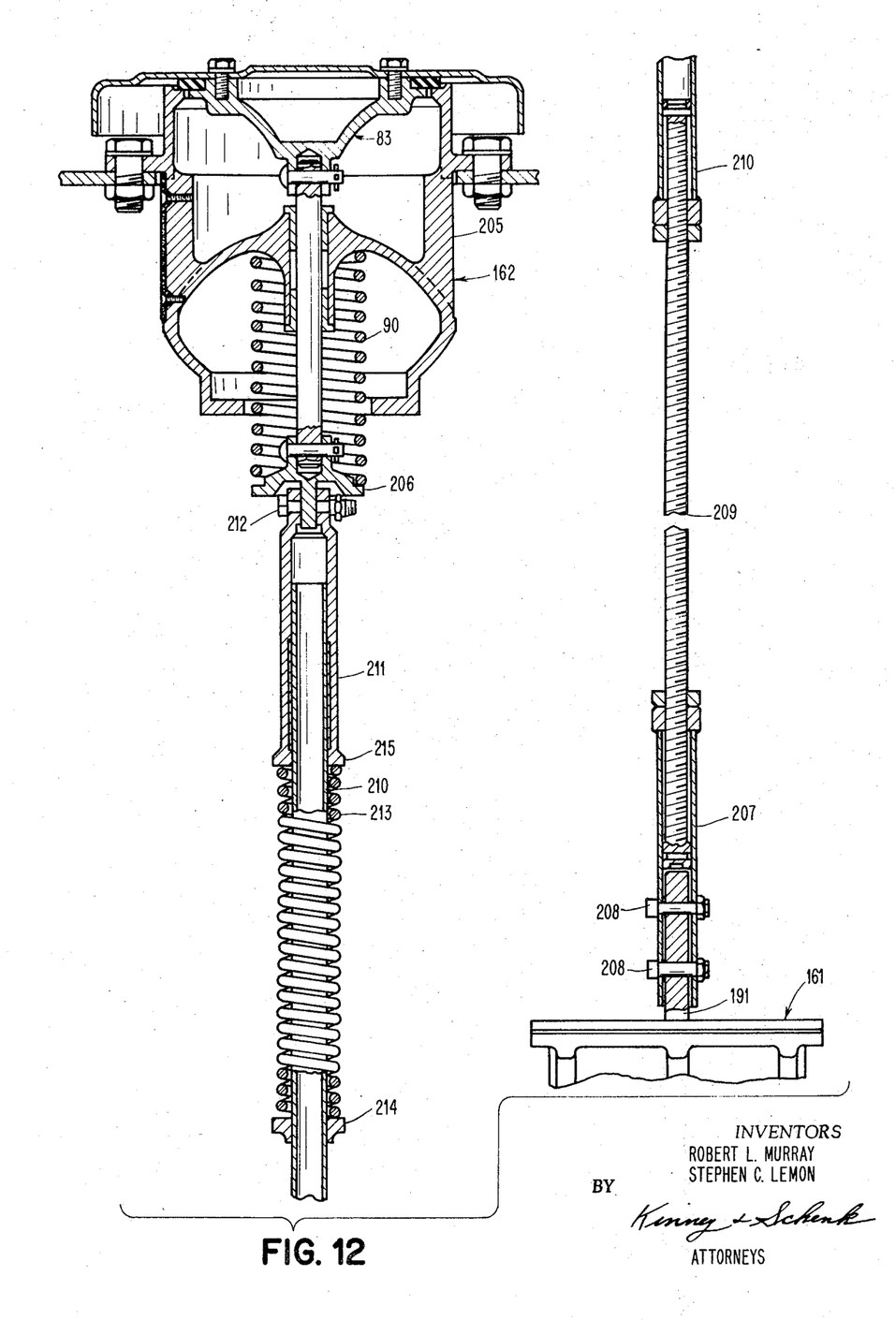
FIG. 12 is a sectional view showing the connection between the valve at the bottom of the container or tank and the vent of the system of FIG. 8.

The upward movement of the stem 194 by the cam 192 not only results in the valve 161 being opened but also causes the vent 162 to be opened. As shown in FIG. 12, the vent 162 is similar to the vent 16 although body 205 does not have the air cylinder 96 secured thereto. Furthermore, the spring retainer 91 is replaced by a spring retainer 206, which is connected to the stem 194 so that upward movement of the stem 194 is transmitted to the deflector 83 to move the deflector 83 upwardly to vent the interior of the container 160 to the atmosphere.

The connection between the stem 194 and the spring retainer 206 includes a connecting rod 207, which is secured to the upper end of the stem 194 by screws 208. The connecting rod 207 has one end of an adjusting screw 209 connected thereto while the other end of the adjusting screw 209 is connected to the lower end of a tube 210, which has its upper end slidably disposed within a connector 211. The upper end of the connector 211 is connected to the lower end of the spring retainer 206 by a bolt 212.

A spring 213 surrounds a portion of the tube 210 and is disposed between a shoulder 214 on the tube 210 and a shoulder 215 on the lower end of the connector 211. Accordingly, the upward movement of the stem 194 is transmitted from the tube 210 to the connector 211 by the spring 214. The maximum upward movement of the deflector 83 before the spring retainer 206 abuts against the bushing 90 is 2 inches while the maximum upward movement of the piston 196 is 2 ½ inches. The spring 213 serves to allow this relative differential movement between the piston 196 of the valve 161 and the deflector 83 of the vent 162.

It should be understood that the deflector 83 of the vent 162 cracks open at 3 p.s.i. and fully opens at 5 p.s.i. in the same manner as the deflector 83 of the vent 16. Thus, if the connecting linkage should fail for any reason, the vent 162 will still open before the container 160 would explode due to the pressure therein.

However, the deflector 83 will remain in its closed position if the tank truck shuld overturn in the same manner as previously described for the vent 16. If the tank truck should overturn and it is desired to empty the container 160 through the valve 161, the deflector 83 could be tied down, and the piston 196 raised sufficiently to allow drainage of gasoline from the container 160.

Accordingly, in the operation of the system of FIG. 8, the compressed air is required only during loading. During unloading it is only necessary to open the valve 161 by rotating the lever 167 counterclockwise.

It should be understood that the level sensor 19 may be either mounted on a vertically disposed rod such as the support rod 20 or on a horizontally disposed rod. When mounted on a vertically disposed rod such as the support rod 20, the support rod 20 would pass through a longitudinal passage 220 (see FIGS. 4 and 5) in the body 24.

When mounted on a horizontally disposed rod, the sensor body 24 would receive the horizontally disposed rod through a longitudinal passage 221. A threaded opening 222 in the body 24 receives a set screw for cooperation with a rod extending through the passage 221.

If desired, the vent 16 at the top of the container 10 in FIG. 6 may be connected to a vapor recovery arrangement. When used with a vapor recovery arrangement, the container 10 would have a shroud, for example, surrounding the vent 16 and mounted on the top of the container 10. The shroud would have a conduit connected to an opening in the shroud and to the vapor recovery arrangement to carry the vapors from the shroud to the vapor recovery arrangement whenever the vent 16 is opened.

With the vapor recovery arrangement, it is necessary for the fluidic interface valve 39 to be disposed within the container 10. This is because the diaphragm of the fluidic interface valve 39 must be subjected to the pressure within the container 10 rather than atmospheric pressure. The fluidic interface valve 39 also is located within the container 10 whenever it is desired for the diaphragm of the fluidic interface valve 39 to be subjected to the pressure within the container 10 rather than to atmosphere.

An advantage of this invention is that a tank truck can be loaded from the ground so that no fumes can affect the operator. Another advantage of this invention is that dangers of explosion or ignition at the manhole opening of a tank are significantly decreased. A further advantage of this invention is that there is no danger of the operator falling from the top of the tank and injuring himself since there is no requirement for him to be on top of the tank. Still another advantage of this invention is that it is not necessary to have any type of extra mechanism to lift the operator to the top of the tank.

For purposes of exemplification, particular embodiments of the invention have been shown and described according to the best present understanding thereof. HOwever, it will be apparent that changes and modifications in the arrangement and construction of the parts thereof may be resorted to without departing from the spirit and scope of the invention.

What is claimed is:

1. A system for loading a container at its bottom with liquid including means to introduce a liquid into the bottom of the container, valve means to control the flow of liquid through said introducing means, means supported within the container to sense when the level of the liquid in the container reaches a predetermined level, said sensing means including means to receive a compressed gas from a source of compressed gas, means to produce a vacuum when the compressed gas is received by said sensing means, and means to prevent the production of the vacuum when the liquid in the container reaches the predetermined level, means responsive to said sensing means, means to connect said vacuum producing means of said sensing means to said responsive means, said responsive means opening said valve means only when the vacuum exists in said sensing means wherein said sensing means senses that the level of the liquid in the container has not reached the predetermined level, said responsive means being disposed within the container, said responsive means closing said valve means when said sensing means senses that the liquid in the container reaches the predetermined level.

2. The system according to claim 1 including means to vent the container and means to cause said vent means to be opened wherever liquid is introduced into the container by said introducing means.

3. The system according to claim 2 in which said valve means controlling flow of liquid through said introducing means is exterior of the container and said introducing means has second valve means in the bottom of the container separate from said valve means controlling the flow of liquid through said introducing means and said vent causing means including means mechanically connecting said second valve means and said vent means.

4. The system according to claim 3 including means to manually actuate said second valve means.

5. The system according to claim 2 in which said valve means is disposed in the bottom of the container and said vent causing means includes means to control the opening of said vent means and said valve means.

6. The system according to claim 1 in which said responsive means includes means to control the supply of a compressed gas to said valve means from a source of compressed gas and said control means allowing the supply of compressed gas to said valve means to open said valve means only when the vacuum exists in said sensing means.

7. The system according to claim 1 in which said sensing means includes a body disposed within the container; said body has a passage to receive a compressed gas from a source of compressed gas, means providing communication between said passage and the exterior of said body to receive liquid from the container when the liquid in the container reaches the predetermined level, and means to produce a vacuum in said passage after the compressed gas has passed from its source through said communication means; and means to connect the vacuum producing portion of said passage with said responsive means.

8. The system according to claim 7 in which said responsive means includes means to control the supply of a compressed gas to said valve means from a source of compressed gas and said control means allowing the supply of compressed gas to said valve means to open said valve means only when the vacuum exists in said sensing means.

9. A fluid circuit for controlling valve means regulating the flow of a liquid into and out of a container including means supported within the container to sense when the level of the liquid in the container reaches a predetermined level, a load valve, means to activate said load valve to supply a pressurized fluid to said sensing means, a shuttle valve, means connecting the outlet of said shuttle valve to the valve means to supply a pressurized fluid thereto, a fluidic interface valve responsive to a first signal from said sensing means when the liquid in the container is not at the predetermined level to supply a pressurized fluid to said shuttle valve to shift said shuttle valve from a first position to a second position to supply the pressurized fluid to the valve means to open the valve means and to said load valve to supply the pressurized fluid to said load valve to hold said load valve in its activated position, said fluidic interface valve being responsive to a second signal from said sensing means when the liquid in the container is at the predetermined level to stop the supply of pressurized fluid to said shuttle valve and to connect said shuttle valve to atmosphere to cause closing of the valve means and to stop the supply of pressurized fluid to said load valve to cause inactivation of said load valve, and unload valve, and means to move said unload valve from a first position to a second position to supply a pressurized fluid to said shuttle valve to shift said shuttle valve from its second position to its first position to supply the pressurized fluid to the valve means to open the valve means and to move said unload valve from its second position to its first position to stop the supply of pressurized fluid to said shuttle valve and to connect said shuttle valve to atmosphere to cause closing of the valve means.

10. The circuit according to claim 9 in which said load valve activating means is manually actuated and said umload valve moving means is manually actuated.

11. The circuit according to claim 9 including a single source of pressurized fluid to supply the pressurized fluid to said sensing means, said load valve, and said unload valve.

12. The circuit according to claim 9 in which said fluidic interface valve is disposed within the container.

13. A system for loading a container at its bottom with liquid including a conduit connected to the bottom of the container, first valve means external of the container to control flow of liquid from a source through said conduit, second valve means supported in the bottom of the container and separate from said first valve means to control flow of the liquid into the container when said first valve means is open, means supported within the container to sense when the level of the liquid in the container reaches a predetermined level, said sensing means including means to receive a compressed gas from a source of compressed gas, means to produce a vacuum when the compressed gas is received by said sensing means, and means to prevent the production of the vacuum when the liquid in the container reaches the predetermined level, means responsive to said sensing means to cause opening of said first valve means when the level of the liquid in the container has not reached the predetermined level, said responsive means causing closing of said first valve means when said sensing means senses that the liquid in the container reaches the predetermined level, and means to open said second valve means to allow the liquid to enter the container when said first valve means is open.

14. The system according to claim 13 including means to vent the container and means to cause said vent means to be opened whenever said second valve means is opened.

15. The system according to claim 14 in which said vent causing means includes means mechanically connecting said second valve means and said vent means.

16. The system according to claim 13 in which said responsive means connects a first pressurized fluid source to said first valve means to open said first valve means and means connects a second pressurized fluid source to said sensing means.

* * * * *